(12) United States Patent
Lin

(10) Patent No.: US 11,392,000 B2
(45) Date of Patent: Jul. 19, 2022

(54) DISPLAY PANEL AND DISPLAY APPARATUS

(71) Applicant: HKC CORPORATION LIMITED, Shenzhen (CN)

(72) Inventor: Pei Hsin Lin, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 805 days.

(21) Appl. No.: 16/319,486

(22) PCT Filed: Dec. 4, 2018

(86) PCT No.: PCT/CN2018/119070
§ 371 (c)(1),
(2) Date: Jan. 22, 2019

(87) PCT Pub. No.: WO2020/107502
PCT Pub. Date: Jun. 4, 2020

(65) Prior Publication Data
US 2021/0373396 A1    Dec. 2, 2021

(30) Foreign Application Priority Data

Nov. 26, 2018  (CN) .......................... 201811412611.1

(51) Int. Cl.
  *G02F 1/1362*   (2006.01)
  *G02F 1/1335*   (2006.01)
  *G02F 1/1345*   (2006.01)

(52) U.S. Cl.
  CPC .. *G02F 1/136222* (2021.01); *G02F 1/136209* (2013.01); *G02F 1/13454* (2013.01); *G02F 1/133512* (2013.01)

(58) Field of Classification Search
  None
  See application file for complete search history.

(56) References Cited

U.S. PATENT DOCUMENTS

| 2016/0116772 | A1  | 4/2016  | Cha et al. |
| 2018/0307071 | A1* | 10/2018 | Chen ................. G02F 1/136209 |
| 2019/0227365 | A1* | 7/2019  | Park .................. G02F 1/133345 |

FOREIGN PATENT DOCUMENTS

| CN | 101923255 A   | 12/2010 |
| CN | 106200135 A   | 12/2016 |
| CN | 107357078 A   | 11/2017 |
| CN | 206757245 U   | 12/2017 |
| CN | 107544175 A   | 1/2018  |
| CN | 107561755 A   | 1/2018  |
| CN | 108415198 A   | 8/2018  |
| KR | 20020094785 A | 12/2002 |
| KR | 20140123137 A | 10/2014 |

OTHER PUBLICATIONS

Xin Wang, the ISA written comments, Sep. 2019, CN.

* cited by examiner

*Primary Examiner* — Richard H Kim

(57) ABSTRACT

The present application discloses a display panel and a display apparatus. The display panel includes a first substrate, a second substrate disposed opposite to the first substrate, a display area for displaying a screen and a non-display area disposed around the display area; the first substrate includes a color filter layer, a filler and a drive circuit; the color filter layer is disposed in the display area of the display panel; the drive circuit is disposed in the non-display area of the display panel, and the filler is disposed on a surface of the drive circuit.

12 Claims, 5 Drawing Sheets

DISPLAY PANEL AND DISPLAY APPARATUS

The present application claims priority to the Chinese Patent Application No. CN201811412611.1, filed with the Chinese Patent Office on Nov. 26, 2018, and entitled "DISPLAY PANEL AND DISPLAY APPARATUS", which is incorporated herein by reference in its entirety.

TECHNICAL FIELD

The present application relates to the technical field of display, and in particular, to a display panel and a display apparatus.

BACKGROUND

The description here only provides background information related to the present application, and does not necessarily constitute the existing technology.

With the development and progress of technology, a flat-panel display becomes a mainstream product of display due to advantages such as thin body, power saving and no radiation, and is widely applied. The flat-panel display includes a thin film transistor-liquid crystal display (T-LCD), an organic light-emitting diode (OLED) display and so on. Among the above, the thin film transistor-liquid crystal display generates a screen by controlling a rotation direction of the liquid crystal molecules to refracting the light ray from a backlight module, and has numerous advantages such as thin body, power saving and no radiation. The organic light-emitting diode display is made of an organic electroluminescence diode, and has various advantages such as self-illumination, short response time, high definition and contrast, and ability of realizing flexible display and large-area full-color display.

The process architecture of a display screen is classified by the driving design, and can be classified into two types, a system on chip (SOC) and a gate driver on array (GOA). From the point of the product requirement, the smaller frame is also as expected. Since GOA has a smaller frame, a driving chip can be omitted, thereby reducing the cost. Therefore, the GOA product will surely be a main trend in the future, but the GOA type display panel easily presents large dark spots while displaying a screen.

SUMMARY

The present application aims to provide a display panel and a display apparatus to reduce dark spots present in the displayed screen.

To realize the above purpose, the present application provides a display panel, including:

a first substrate and a second substrate disposed opposite to the first substrate;

a display area for displaying a screen and a non-display area disposed around the display area;

the first substrate includes a color filter layer, a filler and a drive circuit, the color filter layer is disposed in the display area; the drive circuit is disposed in the non-display area; and the filler is disposed on a surface of the drive circuit.

Optionally, the filler is made of the same material as the color filter layer.

Optionally, the filler at least includes a first filler.

Optionally, the filler includes the first filler, a second filler and a third filler; the color filter layer includes a first color filter, a second color filter and a third color filter; the first filler has the same color as the first color filter; the second filler has the same color as the second color filter; and the third filler has the same color as the third color filter;

The arrangement order of the first filler, the second filler and the third filler is the same as that of the first color filter layer, the second color filter layer and the third color filter layer.

Optionally, the first filler, the second filler and the third filler are in close contact.

Optionally, the first filler, the second filler and the third filler fill the entire drive circuit.

Optionally, the filler has the same height as the color filter layer.

Optionally, the second substrate includes a light shield layer, and the filler is made of the same material as the light shield layer.

Optionally, the drive circuit is provided in plural; and each of the drive circuits is provided with the filler.

Optionally, the fillers on each of the drive circuits are connected as a whole; and the surface of the filler is flat.

Optionally, the drive circuit includes a gate drive circuit.

Optionally, the first substrate is an array substrate.

Optionally, the second substrate is a color film substrate.

The present application also discloses a display panel, including a first substrate, a second substrate disposed opposite to the first substrate, a display area for displaying a screen and a non-display area disposed around the display area;

the first substrate includes a color filter layer, a filler and a drive circuit, the color filter layer is disposed in the display area; the drive circuit is disposed in the non-display area; and the filler is disposed on a surface of the drive circuit;

the filler is made of the same material as the color filter layer and includes a first filler, a second filler and a third filler; the color filter layer includes a first color filter, a second color filter and a third color filter; the first filler has the same color as the first color filter; the second filler has the same color as the second color filter; the third filler has the same color as the third color filter, and the arrangement order of the first filler, the second filler and the third filler is the same as that of the first color filter layer, the second color filter layer and the third color filter layer.

The present application also discloses a display apparatus, including a display panel that includes:

a first substrate and a second substrate disposed opposite to the first substrate;

a display area for displaying a screen and a non-display area disposed around the display area;

the first substrate includes a color filter layer, a filler and a drive circuit, the color filter layer is disposed in the display area; the drive circuit is disposed in the non-display area; and the filler is disposed on a surface of the drive circuit.

Optionally, the filler is made of the same material as the color filter layer.

Optionally, the filler has the same height as the color filter layer.

Compared with the scheme in which there is no filler on the drive circuit, the terrain difference between the display area and the non-display area at the corresponding part of the first substrate is decreased in the present application, so that the space for accommodating air. In this way, it is uneasy to generate large air bubbles while mounting the display panel, thereby presenting large dark spots when the display panel displays a screen.

BRIEF DESCRIPTION OF DRAWINGS

The drawings are included to provide further understanding of embodiments of the present application, which constitute a part of the specification and illustrate the embodiments of the present application, and describe the principles of the present application together with the text description. The drawings are included to provide further understanding of embodiments of the present application, which constitute a part of the specification and illustrate the embodiments of the present application, and describe the principles of the present application together with the text description.

Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

Figure 1:
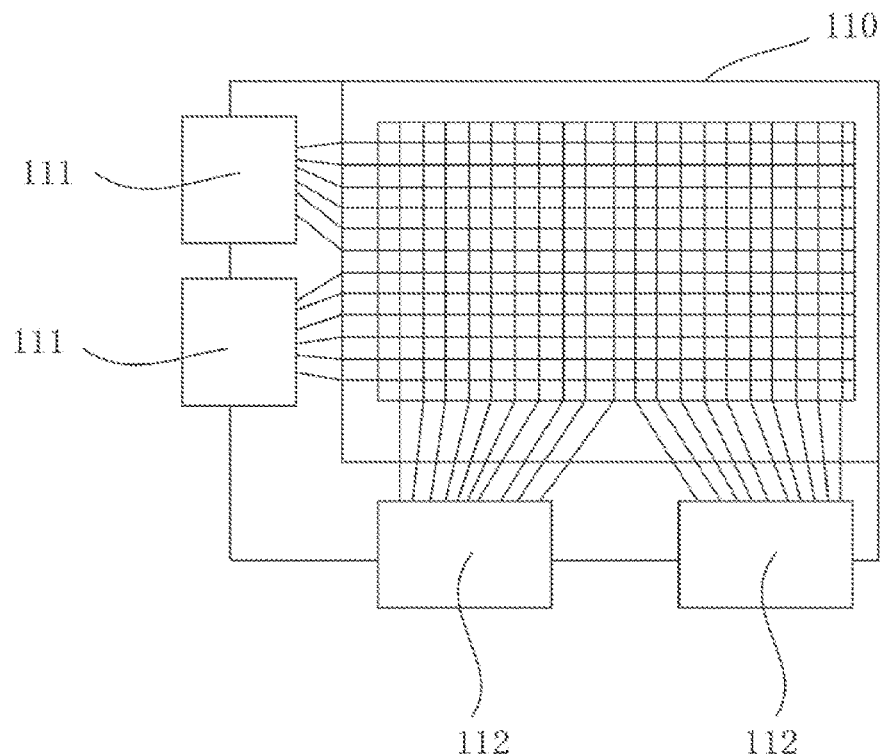
FIG. 1 is a plane schematic diagram of a system on chip of one embodiment in the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the terms "center", "transversal", "upper", "lower", "left", "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying relative importance, or implicitly indicating the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion.

In the description of the present application, it should be understood that, unless otherwise specified and defined, the terms "install", "connected with", "connected to" should be comprehended in a broad sense. For example, these terms may be comprehended as being fixedly connected, detachably connected or integrally connected, mechanically connected or electrically connected; or directly connected or indirectly connected through an intermediate medium, or in an internal communication between two elements. The specific meanings about the foregoing terms in the present application may be understood by those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

Figure 2:
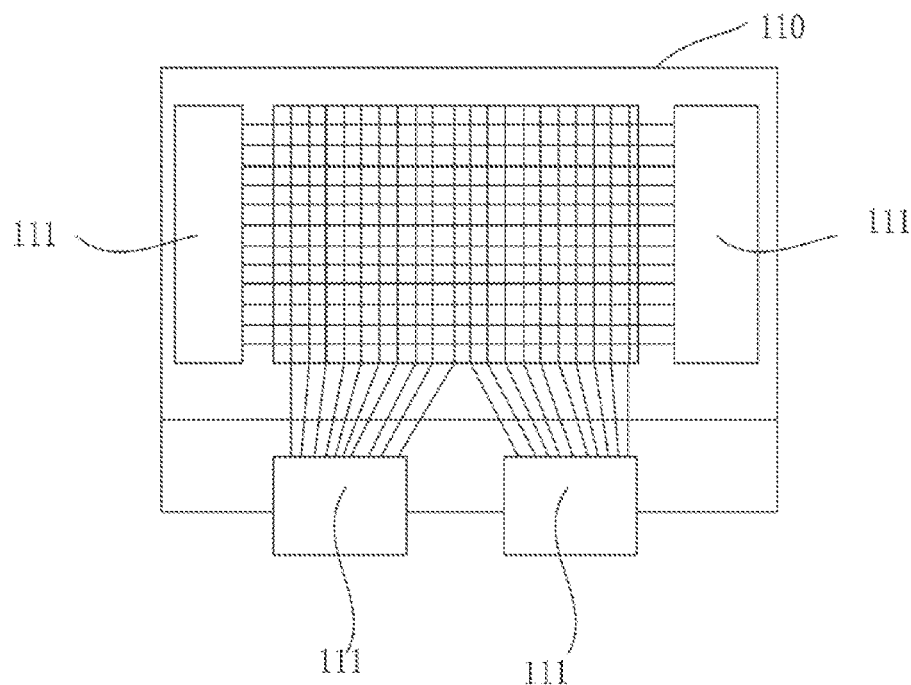
FIG. 2 is a plane schematic diagram of a gate driver on array of one embodiment in the present application.

As shown in FIGS. 1 to 6, the process architecture of a display screen is classified by the driving design, and can be classified into two types, a system on chip (SOC) and a gate driver on array (GOA), shown in FIGS. 1 and 2, respectively. From the point of the product requirement, the smaller frame is also as expected. Therefore, compared with the SOC design, GOA has a smaller frame. GOA is important technology for the panel design, and is mainly advantaged in omitting the driving chip and reducing the cost, and thus the GOA product will surely be a main trend in the future.

However, a color filter on TFT (COT) is used to manufacture a color filter circuit by changing making the color filter on an upper plate to making it on a lower plate. The benefits are that the pixel opening ratio can be improved and the opportunity of uneven display brightness is reduced. Therefore, the product of COT+GOA will surely be a main trend in the future.

Figure 3:
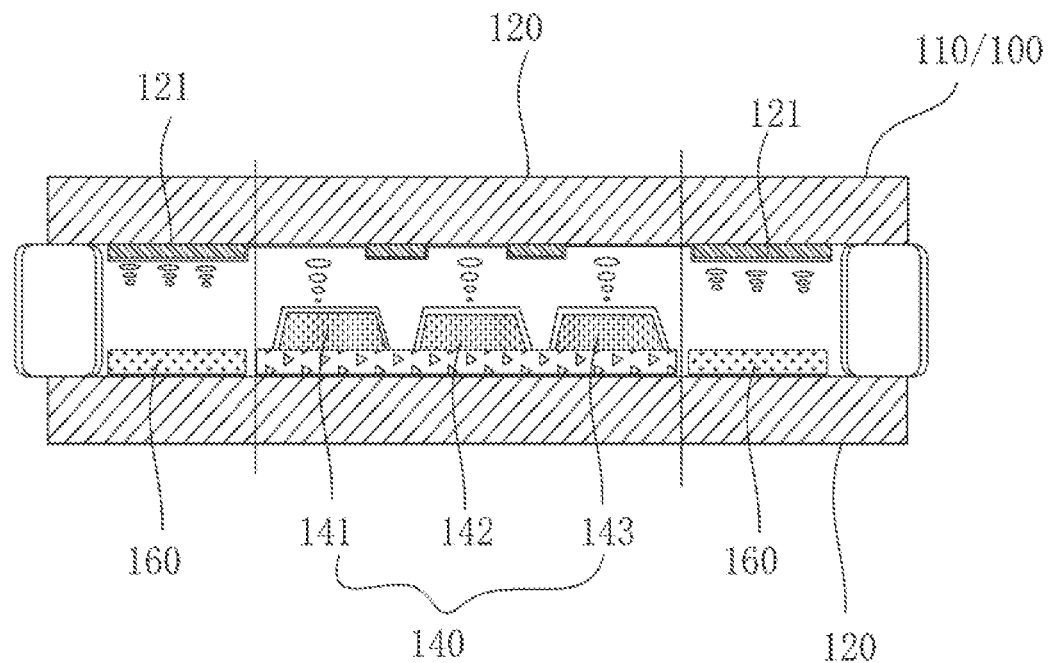
FIG. 3 is a side schematic diagram of a display panel module architecture of one embodiment in the present application.
Figure 4:
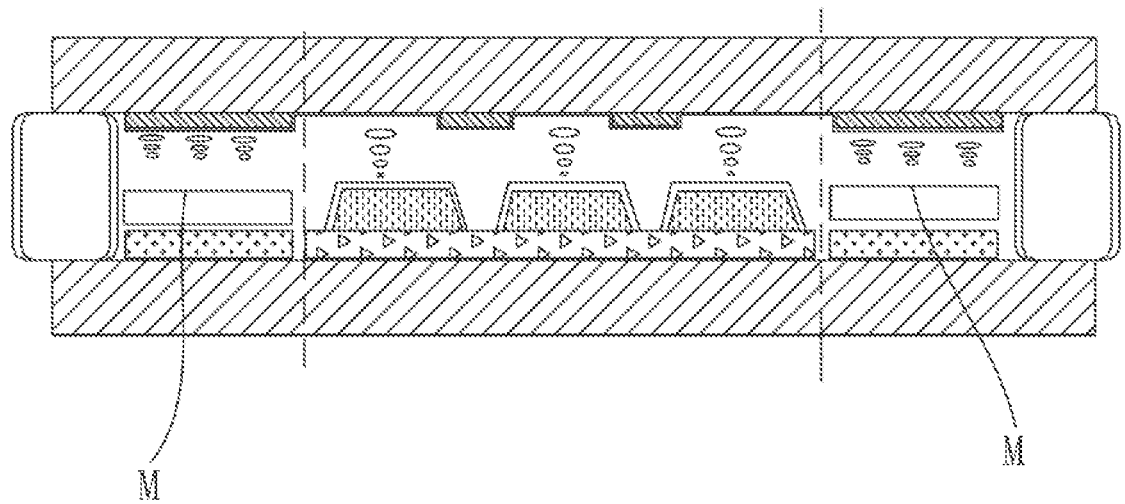
FIG. 4 is a schematic diagram of a display panel, that generates air bubbles, of one embodiment in the present application.
Figure 5:
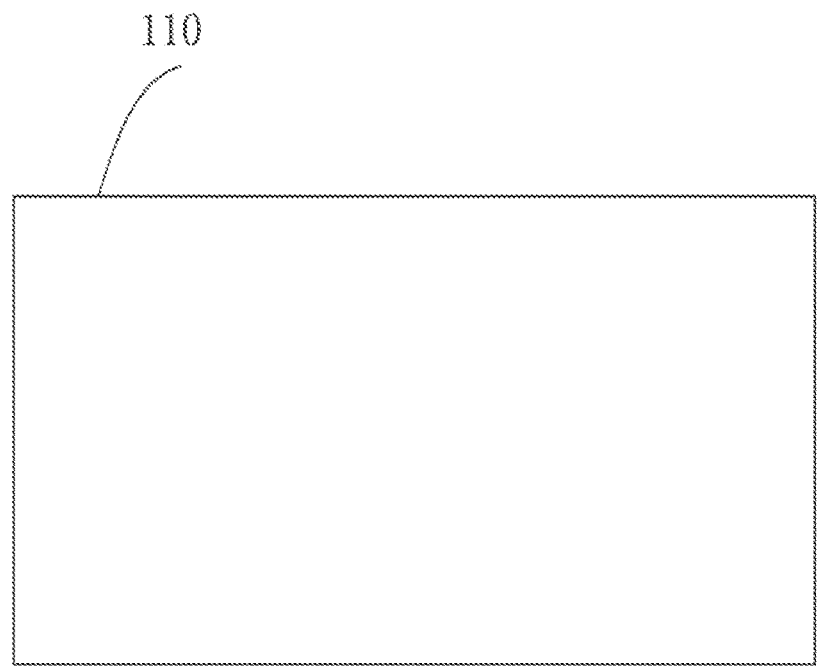
FIG. 5 is a schematic diagram of normal display of one embodiment in the present application.
Figure 6:
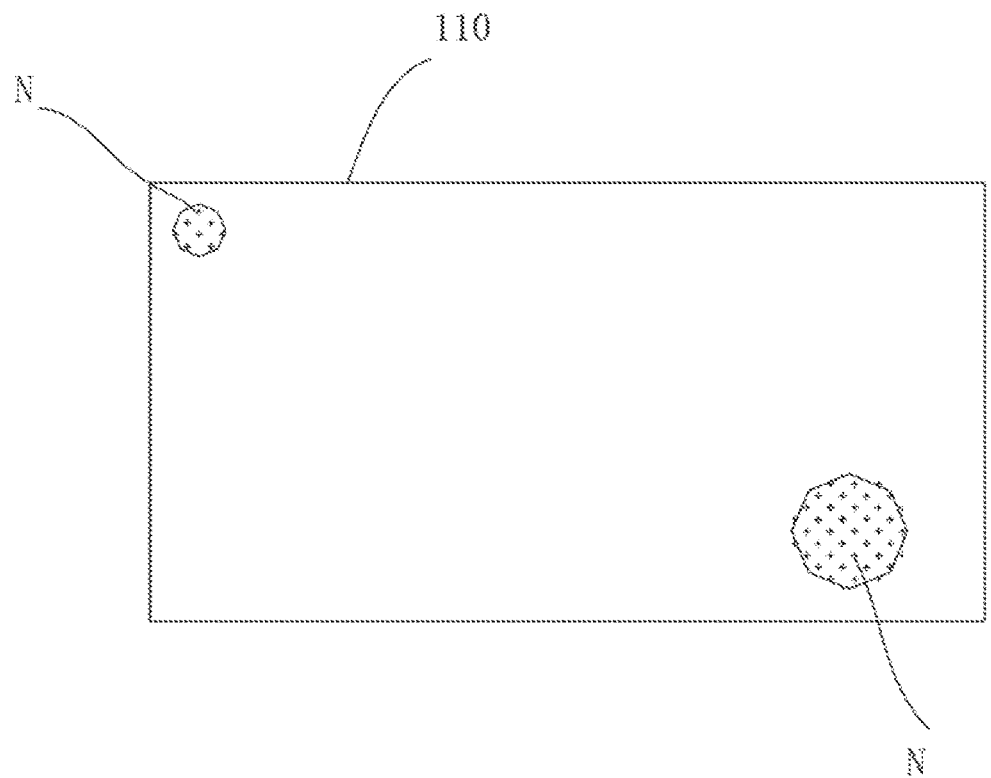
FIG. 6 is a schematic diagram of display with dark spots of one embodiment in the present application.

The applicant is using a "COT+GOA" product that is not disclosed. Since the terrain of GOA and the color filter layer have large terrain difference, there is easily air accumulated, as shown in FIGS. 3 and 4, where a part where air accumulates is represented by M. When this space is moved by the panel, air might slowly flow to the display area. Liquid crystal will be pushed away, since air flows to the display area. The display area becomes dark due to the air bubbles. FIG. 5 is a screen of normal display of the normal display panel, and when the displayed screen presents dark spots, as shown in FIG. 6, where the dark spots are represented by N. How to solve the air bubbles of COT+GOA is currently a very important issue.

The present application is illustrated below in reference with the drawings and embodiments.

As shown in FIGS. 7 to 10, an embodiment of the present application discloses a display panel 110 that includes: a first substrate 120, a second substrate 130 disposed opposite to the first substrate 120, a display area 113 for displaying a screen and a non-display area 114 disposed around the display area 113; the first substrate 120 includes a color filter layer 140, a filler 150 and a drive circuit 160; the color filter layer 140 is disposed in the display area 113; the drive circuit 160 is disposed in the non-display area 114; and the filler 150 is disposed on a surface of the drive circuit 160.

The drive circuit 160 is a gate drive circuit 111.

In this scheme, since the color filter layer 140 and the drive circuit 160 are made on one substrate with large terrain difference therebetween, air is easily accumulated above the drive circuit 160 to generate air bubbles while mounting; the air bubbles move with the panel, liquid crystal will be pushed away when the air bubbles move to the display area, so that this area cannot be displayed normally, and the display panel 110 presents dark spots while displaying a screen; and the filler 150 is added above the drive circuit 160 in this scheme to reduce the terrain difference of the display area 113 and the non-display area 114 at the corresponding part of the first substrate, so that the space for accommodating air is reduced. In this way, it is uneasy to generate large air bubbles while mounting the display panel 110, thereby presenting large dark spots when the display panel 110 displays a screen.

In one embodiment, the filler 150 is made of the same material as the color filter layer 140.

The filler 150 and the color filter 140 are completed simultaneously in one manufacture procedure.

In this scheme, the procedure of processing the filler 150 separately is omitted, thereby reducing the processing time.

In one embodiment, the filler 150 at least includes a first filler 151.

In this scheme, the color filter layer 140 in the display panel 110 generally chooses three color filters: red, green and blue; the first filler 151 can be formed together with the red color filter layer 140 in the same manufacture procedure, can also be formed together with the green color filter layer 140 in the same manufacture procedure, and can also be formed together with the blue color filter layer 140 in the same manufacture procedure.

In one embodiment, the filler 150 includes the first filler 151, a second filler 152 and a third filler 153; the color filter layer 140 includes a first color filter 141, a second color filter 142 and a third color filter 143; the first filler 151 has the same color as the first color filter 141; the second filler 152 has the same color as the second color filter 142; and the third filler 153 has the same color as the third color filter 143;

The arrangement order of the first filler 151, the second filler 152 and the third filler 153 is the same as that of the first color filter layer 141, the second color filter layer 142 and the third color filter layer 143.

In this scheme, the color filter layer 140 is generally manufactured by mask development technology. When a mask configured as the color filter layer 140 and the filler 150 is manufactured, the width and arrangement number of the mask are added on the basis of the existing mask for manufacturing the color filter layer 140. Therefore, the arrangement manner of the first filler 151, the second filler 152 and the third filler 153 in the filler 150 is kept the same as the arrangement manner of the first color filter 141, the second color filter 142 and the third color filter 143 in the color filter layer 140 to facilitate manufacture of the mask.

Figure 8:
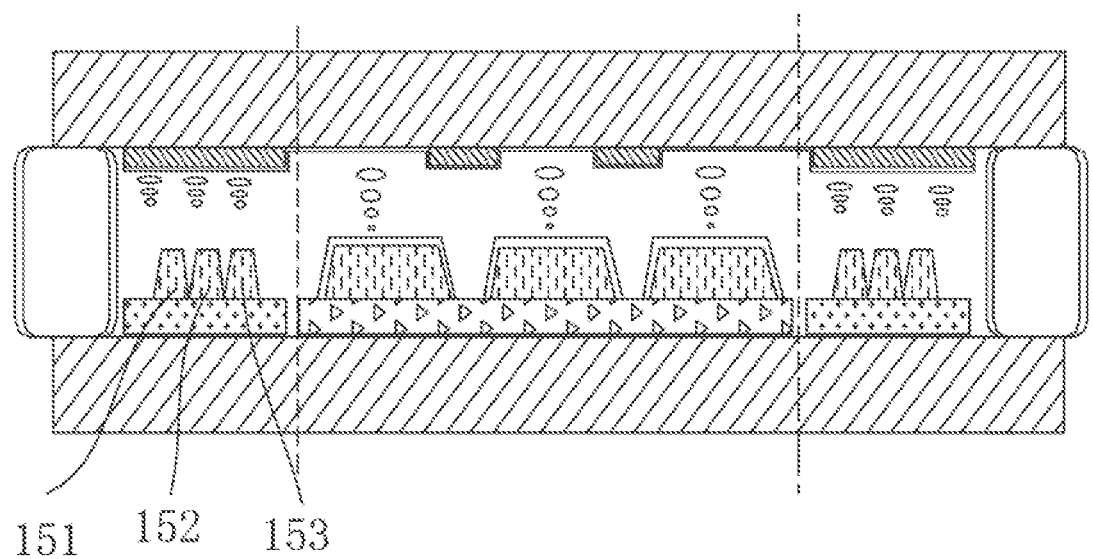
FIG. 8 is a schematic diagram of the display panel module architecture, including three fillers in close contact, of one embodiment in the present application.

As shown in FIG. 8, in one embodiment, the first filler 151, the second filler 152 and the third filler 153 are in close contact.

In this scheme, oversize gap between the first filler 151, the second filler 152 and the third filler 153 easily causes much air accumulation. Therefore, the first filler 151, the second filler 152 and the third filler 153 are in close contact, so that less air is accumulated between the three fillers 150, and thus the generated air bubbles are smaller.

In one embodiment, the first filler 151, the second filler 152 and the third filler 153 fill above the entire drive circuit 160.

In this scheme, the first filler 151, the second filler 152 and the third filler 153 fill the drive circuit 160 to prevent air from accumulating.

Figure 9:
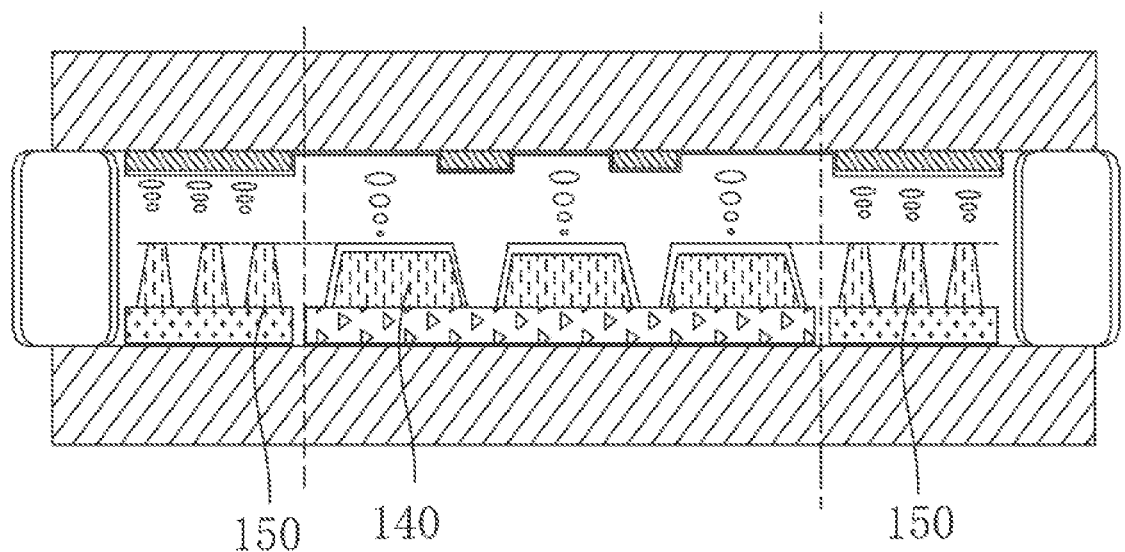
FIG. 9 is a schematic diagram of the display panel module architecture, including a filler with the same height as the color filter layer, of one embodiment in the present application.

As shown in FIG. 9, in one embodiment, the filler 150 has the same height as the color filter layer 140.

In this scheme, if the filler 150 is lower than the color filter layer 140, air will be remained due to height difference while mounting the display panel 110, thereby generating air bubbles; and if the filler 150 is higher than the color filter layer 140, air is directly accumulated above the color filter layer 140, and thus the filler 150 and the color filter layer 140 are kept at the same height, so as to realize a better effect and remain less air.

In one embodiment, the second substrate 130 includes a light shield layer 121; and the filler 150 is made of the same material as the light shield layer 121.

In this scheme, the light shield layer 121 has a light shield effect, while the drive circuit 160 is disposed in the non-display area 114 with no need for display, and thus there is no need for the light to pass through; and disposing the filler 150 having the same material as the light shield layer 121 above the drive circuit 160 can increase the light shield effect of the non-display area 114.

In one embodiment, the drive circuit 160 is provided in plural, and each of the drive circuits 160 is provided with a filler 150.

In this scheme, the display panel 110 includes a plurality of drive circuits 160, and if the filler 150 is disposed above each of the drive circuits 160, it is uneasy for the air to accumulate above each of the drive circuits 160, and finally the generated air bubbles are relatively small.

Figure 10:
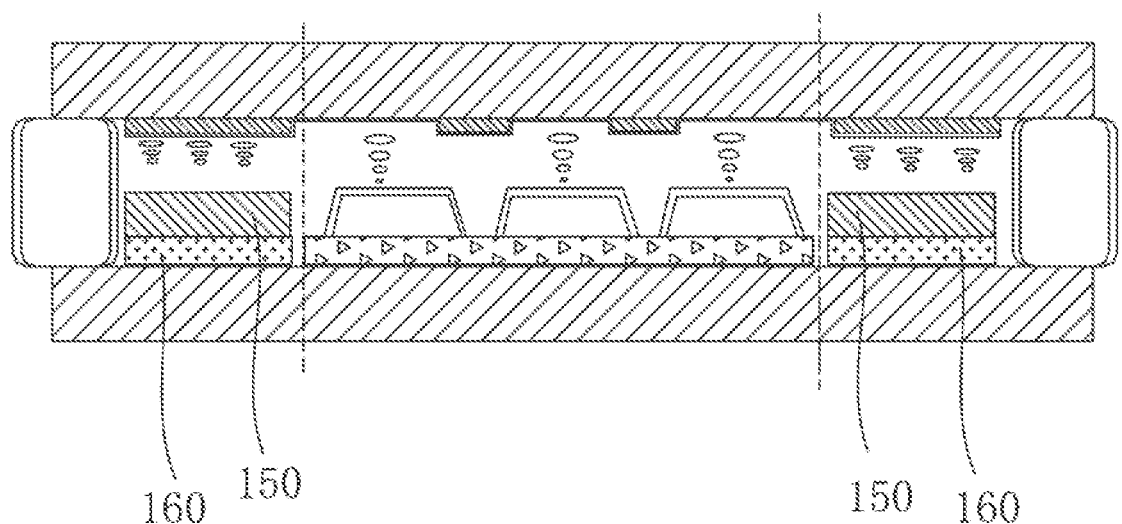
FIG. 10 is a schematic diagram of another display panel module architecture of one embodiment in the present application.

As shown in FIG. 10, in one embodiment, the fillers 150 on each of the drive circuits 160 are connected as a whole, and the surface of the filler 150 is flat.

In this scheme, each filler 150 is a whole and has a flat surface, a groove and a gap will not be generated, and there is no place to accommodate air in the filler 150, thereby reducing the air content in the display panel 110 and reducing air bubbles.

As another embodiment of the present application, referring to FIGS. 7 to 10, it discloses a display panel 110 including a first substrate, 120, a second substrate 130 disposed opposite to the first substrate 120, a display area 113 for displaying a screen and a non-display area 114 disposed around the display area 113.

The first substrate 120 includes a color filter layer 140, a filler 150 and a drive circuit 160; the color filter layer 140 is disposed within the display area; the drive circuit 160 is disposed in the non-display area; and the filler 150 is disposed on a surface of the drive circuit 160;

the filler 150 is made of the same material as the color filter layer 140 and includes a first filler 151, a second filler 152 and a third filler 153; the color filter layer 140 includes a first color filter 141, a second color filter 142 and a third color filter 143; the first filler 151 has the same color as the first color filter 141; the second filler 152 has the same color as the second color filter 142; the third filler 153 has the same color as the third color filter 143; and the arrangement order of the first filler 151, the second filler 152 and the third filler 153 is the same as that of the first color filter 141 layer 141, the second color filter 142 layer 142 and the third color filter 143 layer 143.

In this scheme, in the technical field of the gate drive on array (GOA) and the color filter on TFT (COT), since the color filter layer 140 and the drive circuit 160 are made on one substrate with large terrain difference therebetween, air is easily accumulated above the drive circuit 160 to generate air bubbles while mounting; the air bubbles move with the panel, liquid crystal will be pushed away when the air bubbles move to the display area 113, so that this area cannot be displayed normally, and the display panel 110 presents dark spots while displaying a screen; and the filler 150 is added above the drive circuit 160 in this scheme to reduce the terrain difference of the display area 113 and the non-display area 114 at the corresponding part of the first substrate, so that the space for accommodating air is reduced. In this way, it is uneasy to generate large air bubbles while mounting the display panel 110, thereby presenting large dark spots when the display panel 110 displays a screen.

Figure 7:
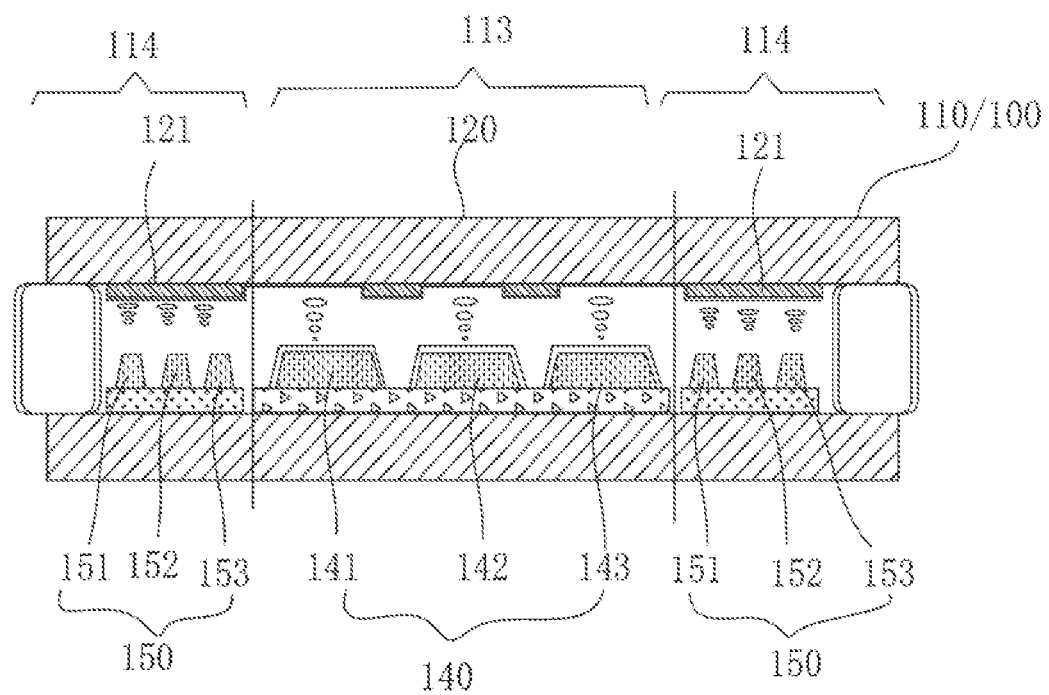
FIG. 7 is a schematic diagram of the display panel module architecture, including a color filter layer material as a filler, of one embodiment in the present application.

As another embodiment of the present application, as shown in FIG. 7, the color filter on TFT manufacture procedure includes RGB color filter manufacture procedure after the array substrate manufacture procedure, while in the present application, the RGB color filter manufacture procedure is carried out after completing the drive circuit 160.

As another embodiment of the present application, as shown in FIGS. 7 to 10, it discloses a display apparatus 100 that includes the above display panel 110.

The technical scheme of the present application can be widely applied to a flat-panel display such as a thin film transistor-liquid crystal display (TFT-LCD) and an organic light-emitting diode (OLED) display.

The above contents are detailed descriptions for the present application in conjunction with the specific optional implementation, and it cannot be affirmed that the specific implementation of the present application is only limited to these descriptions. For those skilled in the art of the present application, several simple deductions or replacements can further be made without departing from the idea of the present application and should be deemed as belonging to the scope of protection of the present application.

What is claimed is:

1. A display panel, comprising:
   a first substrate;
   a second substrate disposed opposite to the first substrate;
   a display area configured to display a screen; and
   a non-display area disposed around the display area;
   wherein the first substrate comprises a color filter layer, a filler and a drive circuit, the color filter layer is disposed in the display area; the drive circuit is disposed in the non-display area; and the filler is disposed on a surface of the drive circuit;
   wherein the filler is made of the same material as the color filter layer;
   wherein the filler at least comprises a first filler; and
   wherein the filler comprises the first filler, a second filler and a third filler; the color filter layer comprises a first color filter, a second color filter and a third color filter; the first filler has the same color as the first color filter; the second filler has the same color as the second color filter; and the third filler has the same color as the third color filter.

2. The display panel according to claim 1, wherein an arrangement order of the first filler, the second filler and the third filler is the same as that of the first color filter layer, the second color filter layer and the third color filter layer.

3. The display panel according to claim 1, wherein the first filler, the second filler and the third filler are in close contact.

4. The display panel according to claim 1, wherein the first filler, the second filler and the third filler fill the entire drive circuit.

5. The display panel according to claim 1, wherein the filler has the same height as the color filter layer.

6. The display panel according to claim 1, wherein the drive circuit is provided in plural; and each of the drive circuits is provided with the filler.

7. The display panel according to claim 6, wherein the fillers on each of the drive circuits are connected as a whole; and a surface of the filler is flat.

8. The display panel according to claim 1, wherein the drive circuit comprises a gate drive circuit.

9. The display panel according to claim 1, wherein the first substrate is an array substrate.

10. A display panel, comprising:
    a first substrate;
    a second substrate disposed opposite to the first substrate;
    a display area configured to display a screen; and
    a non-display area disposed around the display area;
    wherein the first substrate comprises a color filter layer, a filler and a drive circuit, the color filter layer is disposed in the display area; the drive circuit is disposed in the non-display area; and the filler is disposed on a surface of the drive circuit;
    the filler is made of the same material as the color filter layer and comprises a first filler, a second filler and a third filler; the color filter layer comprises a first color filter, a second color filter and a third color filter; the first filler has the same color as the first color filter; the second filler has the same color as the second color filter; the third filler has the same color as the third color filter; and an arrangement order of the first filler, the second filler and the third filler is the same as that of the first color filter layer, the second color filter layer and the third color filter layer.

11. A display apparatus, comprising a display panel that comprises:
    a first substrate;
    a second substrate disposed opposite to the first substrate;
    a display area configured to display a screen; and
    a non-display area disposed around the display area;
    wherein the first substrate comprises a color filter layer, a filler and a drive circuit, the color filter layer is disposed in the display area; the drive circuit is disposed in the non-display area; and the filler is disposed on a surface of the drive circuit;
    wherein the filler is made of the same material as the color filter layer;
    wherein the filler at least comprises a first filler; and
    wherein the filler comprises the first filler, a second filler and a third filler; the color filter layer comprises a first color filter, a second color filter and a third color filter; the first filler has the same color as the first color filter; the second filler has the same color as the second color filter; and the third filler has the same color as the third color filter.

12. The display apparatus according to claim 11, wherein the filler has the same height as the color filter layer.

* * * * *